United States Patent
Kameta et al.

(10) Patent No.: US 10,718,641 B2
(45) Date of Patent: Jul. 21, 2020

(54) PHYSICAL QUANTITY MEASUREMENT DEVICE AND ELECTRONIC APPARATUS

(71) Applicant: Seiko Epson Corporation, Tokyo (JP)

(72) Inventors: Takahiro Kameta, Okaya (JP); Shinji Nishio, Suwa (JP)

(73) Assignee: Seiko Epson Corporation (JP)

( * ) Notice: Subject to any disclaimer, the term of this patent is extended or adjusted under 35 U.S.C. 154(b) by 10 days.

(21) Appl. No.: 15/890,591

(22) Filed: Feb. 7, 2018

(65) Prior Publication Data

US 2018/0231405 A1 Aug. 16, 2018

(30) Foreign Application Priority Data

Feb. 13, 2017 (JP) ................................. 2017-023837

(51) Int. Cl.
  *G01D 11/30* (2006.01)
  *G01P 15/18* (2013.01)
  *G01P 1/02* (2006.01)

(52) U.S. Cl.
  CPC .............. *G01D 11/30* (2013.01); *G01P 1/023* (2013.01); *G01P 1/026* (2013.01); *G01P 15/18* (2013.01)

(58) Field of Classification Search
  CPC .................................................... G01D 11/30
  USPC ........................................................ 73/866.5
  See application file for complete search history.

(56) References Cited

U.S. PATENT DOCUMENTS

| 8,256,287 B2 * | 9/2012 | Karmazyn ............. G01D 11/30 73/431 |
| 2006/0130584 A1 * | 6/2006 | Ono ........................ G01P 1/023 73/514.36 |
| 2007/0102810 A1 * | 5/2007 | Matsumiya ............... B81B 7/02 257/723 |
| 2014/0123754 A1 * | 5/2014 | Watanabe ............... G01P 1/023 73/514.01 |
| 2017/0248553 A1 * | 8/2017 | Potts .................... G01N 29/223 |

FOREIGN PATENT DOCUMENTS

| EP | 0644586 A2 * | 3/1995 | ............. G01D 11/30 |
| JP | 2004-037105 A | 2/2004 | |
| JP | 2014-119412 A | 6/2014 | |

OTHER PUBLICATIONS

English Translation of Lindner (EP0644586) abstract and specification.

\* cited by examiner

Primary Examiner — Nimeshkumar D Patel
Assistant Examiner — Jean F Morello
(74) Attorney, Agent, or Firm — Harness, Dickey & Pierce, P.L.C.

(57) ABSTRACT

A physical quantity measurement device includes a physical quantity measurement sensor and a metal block that is a holding member that includes block surfaces that serve as a plurality of holding portions for holding the physical quantity measurement sensor, and the block surface has a groove formed in a region facing the physical quantity measurement sensor.

10 Claims, 10 Drawing Sheets

PHYSICAL QUANTITY MEASUREMENT DEVICE AND ELECTRONIC APPARATUS

BACKGROUND

1. Technical Field

The present invention relates to a physical quantity measurement device and an electronic apparatus including the physical quantity measurement device.

2. Related Art

In the related art, as a physical quantity measurement device, for example, a physical quantity measurement device disclosed in JP-A-2004-37105 is known in which a sensor chip for measuring a physical quantity (physical quantity measurement sensor) such as displacement, velocity, and acceleration of an object to be measured in a direction is directly attached to two or more respective wall portions which are included in a mounting member and orthogonal to one another. Since a plurality of sensor chips is attached to mutually orthogonal wall portions of the mounting member, it is possible to accurately measure two or more physical quantities orthogonal to one another without deviation in parallelism with respect to the measurement direction of the respective sensor chips.

In addition, since a plurality of sensor chips is attached to the mounting member having a large heat capacity, it is possible to maintain each of the sensor chips in a state of having an almost constant temperature and to keep measurement accuracy high.

However, in the physical quantity measurement device disclosed in JP-A-2004-37105, the sensor chip requires a large area so as to be kept attached without falling. For this reason, there is a possibility that thermal stress concentrates on the corner portion of the sensor chip and airtightness of the sensor chip is destroyed due to the difference in the thermal expansion coefficient between a bonding member, such as an adhesive, and the sensor chip, which may lead to deterioration of function as a physical quantity measurement device.

SUMMARY

An advantage of some aspects of the invention is to solve at least a part of the problems described above, and the invention can be implemented as the following forms or application examples.

Application Example 1

A physical quantity measurement device according to this application example includes: a physical quantity measurement sensor; and a holding member that includes a plurality of holding portions for holding the physical quantity measurement sensor, and the holding portion has a groove formed in a region facing the physical quantity measurement sensor.

According to this application example, since the holding portion that holds the physical quantity measurement sensor has the groove formed in the region facing the physical quantity measurement sensor, an extra amount of a bonding member flows into the groove in a case where the physical quantity measurement sensor is held by the holding portion using the bonding member such as an adhesive. Therefore, it is possible to prevent the bonding member from spreading over the entire physical quantity measurement sensor, and to reduce a decrease in airtightness of the physical quantity measurement sensor due to stress distortion which is likely to occur at the corner portion of the physical quantity measurement sensor. As a result, it is possible to provide a physical quantity measurement device capable of maintaining high accuracy.

Application Example 2

In the physical quantity measurement device according to the application example, it is preferable that the groove is not connected with a groove that is formed in an adjacent holding portion.

According to this application example, the groove is not connected with the groove formed in the adjacent holding portion. Therefore, it is possible to suppress the flowing of the bonding member into the groove formed in the adjacent holding portion.

Application Example 3

In the physical quantity measurement device according to the application example, it is preferable that the physical quantity measurement sensor is bonded to a region surrounded by the groove.

According to this application example, the region to which the physical quantity measurement sensor is attached is surrounded by the groove. Therefore, it is possible to prevent the bonding member from spreading to the corner portion of the physical quantity measurement sensor. For this reason, it is possible to reduce a decrease in airtightness of the physical quantity measurement sensor due to stress distortion which is likely to occur at the corner portion of the physical quantity measurement sensor.

Application Example 4

In the physical quantity measurement device according to the application example, it is preferable that the groove intersects with at least a part of an edge portion of the physical quantity measurement sensor.

According to this application example, since the physical quantity measurement sensor, even including the edge portion thereof, is bonded to the holding portion, the bonding area can be increased such that the sensor is not easily separated from the holding portion, and impact resistance can be improved.

Application Example 5

In the physical quantity measurement device according to the application example, it is preferable that a region to which the physical quantity measurement sensor is bonded overlaps with the center of the physical quantity measurement sensor in a plan view from a direction in which the physical quantity measurement sensor and the holding portion overlap with each other.

According to this application example, the overlap with the center of the physical quantity measurement sensor makes it possible to bond the physical quantity measurement sensor in a stable attitude, and to measure a physical quantity with high accuracy.

Application Example 6

In the physical quantity measurement device according to the application example, it is preferable that the physical quantity measurement sensor has a sensor element including a movable portion extending from a fixed portion, and in a plan view from a direction in which the physical quantity measurement sensor and the holding portion are stacked, the groove is provided in a direction intersecting with a direction in which the movable portion extends from the fixed portion.

According to this application example, the groove is formed in the direction intersecting with the direction in which the movable portion extends from the fixed portion. Therefore, when the physical quantity measurement sensor is bonded to the holding member, it is possible to prevent the bonding member from spreading to the fixed portion region of the sensor element. In addition, thermal stress caused by the difference in the thermal expansion coefficient between a bonding member and the physical quantity measurement sensor at the time of bonding is hard to be transmitted to the fixed portion. Therefore it is possible to maintain high accuracy.

Application Example 7

An electronic apparatus according to this application example includes the physical quantity measurement device according to the application example described above.

According to this application example, it is possible to provide the electronic apparatus including the physical quantity measurement device capable of maintaining high accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferable configuration examples of a physical quantity measurement device and an electronic apparatus of the invention will be described with reference to the accompanying drawings.

First Embodiment

Physical Quantity Measurement Device

First, for a physical quantity measurement device according to a first embodiment, a physical quantity measurement device 100 that measures physical quantities in multiple axes will be described with reference to FIGS. 1 and 2, by way of example.

Figure 1:
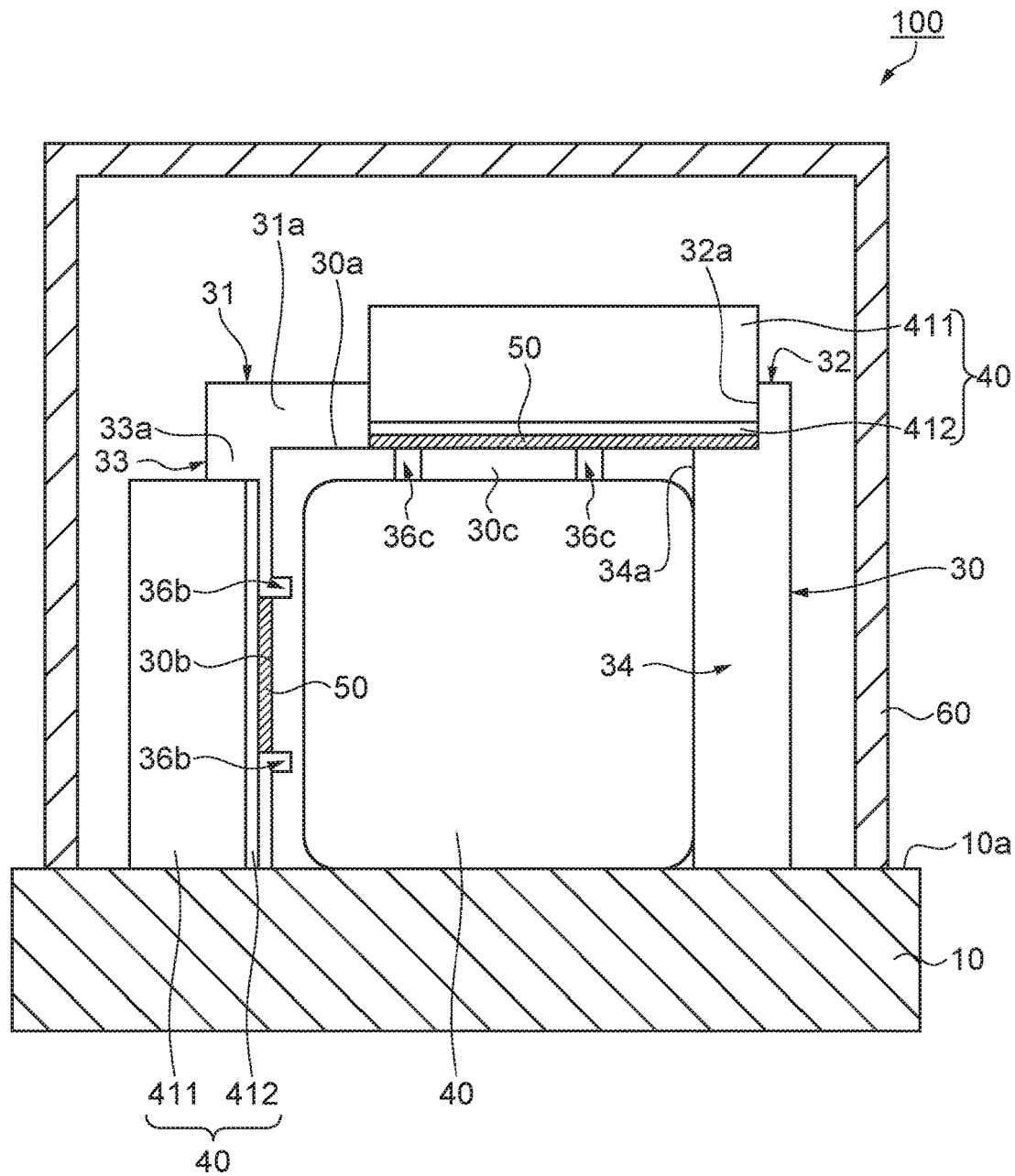
FIG. 1 is a cross sectional view showing a configuration of a physical quantity measurement device according to a first embodiment of the invention.
Figure 2:
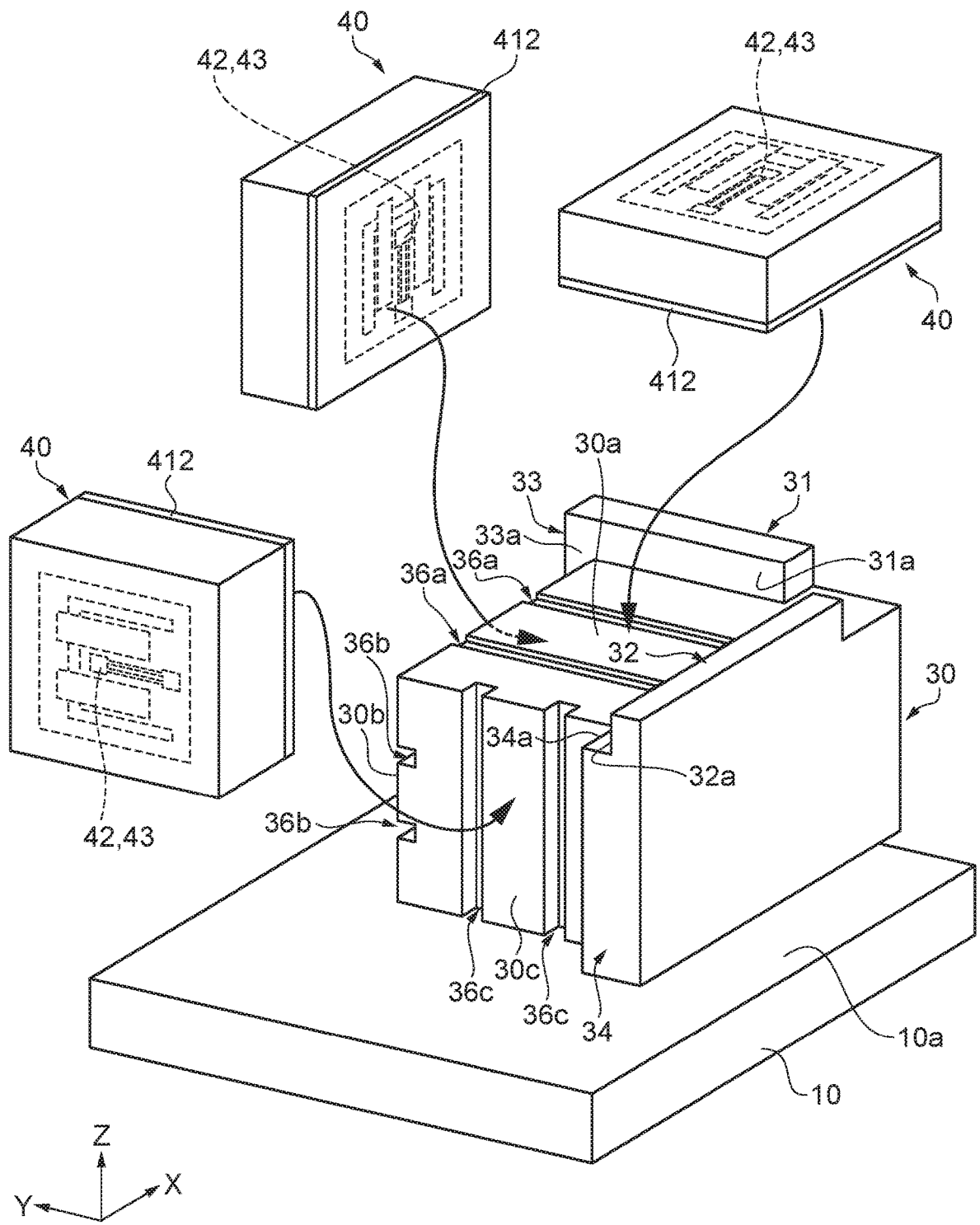
FIG. 2 is an exploded perspective view showing the configuration of the physical quantity measurement device according to the first embodiment.

FIG. 1 is a cross sectional view showing a configuration of a physical quantity measurement device according to the first embodiment of the invention, and FIG. 2 is an exploded perspective view showing the configuration of the physical quantity measurement device according to the first embodiment. In FIG. 2, the shape and arrangement of component parts are mainly shown, and so the device cover 60, the wirings, and the like are omitted. In each figure, the X-axis, the Y-axis, and the Z-axis are shown as three axes orthogonal to one another.

As shown in FIGS. 1 and 2, the physical quantity measurement device 100 includes a metal base plate 10 having a quadrangular plate shape and positioned parallel to an XY plane, a metal block 30 that is a hexahedron-shaped holding member positioned on a receiving surface 10*a* that is a surface on the Z (+) side of the metal base plate 10, physical quantity measurement sensors 40 that are each held on a corresponding one of three surfaces, that is, a block surface 30*a* that is a holding portion positioned on the upper side of the metal block 30 opposite to the metal base plate 10, and a block surface (holding portion) 30*b* and a block surface (holding portion) 30*c*, positioned on each of the sides adjacent to the block surface 30*a*, and a device cover 60 that covers the metal block 30 and the physical quantity measurement sensor 40 provided on the metal base plate 10. The physical quantity measurement sensor 40 includes a package base 411 and a lid (lid body) 412 which will be described in detail with reference to FIGS. 3 and 4.

In addition, the block surface 30*a* on which the physical quantity measurement sensor 40 is held has two grooves 36*a* extending along the Y-axis direction and provided at a predetermined interval from each other, a protrusion portion 31 provided along the Y axis at the end portion in the X (+) axis direction and protruding in the Z (+) axis direction, and a protrusion portion 32 provided along the X-axis direction at the end portion in the Y (−) axis direction and protruding in the Z (+) axis direction. Similarly, the block surface 30*b* has two grooves 36*b* extending along the X-axis direction and provided at a predetermined interval from each other, and a protrusion portion 33 provided along the Z-axis at the end portion in the X (+) axis direction and protruding in the Y (+) axis direction. The block surface 30*c* has two grooves 36*c* extending along the Z-axis direction and provided at a predetermined interval from each other, and a protrusion portion 34 provided along the Z-axis direction at the end portion of the Y (−) axis direction and protruding in the X (−) axis direction. In this case, the metal block 30 is integrally formed including the protrusion portions 31, 32, 33 and 34. The grooves 36a, grooves 36b and grooves 36c are provided in the block surface 30a, block surface 30b, and block surface 30c, respectively, in a manner in which the grooves are not allowed to be connected to each other. In other words, directions of the grooves 36a, grooves 36b and grooves 36c are formed are set so that they are in a mutually torsional relationship. With such a configuration, it is possible to prevent a bonding member 50 from flowing into grooves 36a, 36b and 36c formed in the adjacent holding portions.

The protrusion portion 31 has a side wall portion 31a orthogonal to the block surface 30a, and the protrusion portion 32 has a side wall portion 32a orthogonal to the block surface 30a. The physical quantity measurement sensor 40 which is held on the block surface 30a is joined to the block surface 30a in a state in which the lid 412 is connected to the block surface 30a, the side wall portion 31a, and the side wall portion 32a. Similarly, the protrusion portion 33 has a side wall portion 33a orthogonal to the block surface 30b, and the physical quantity measurement sensor 40 which is held on the block surface 30b is joined to the block surface 30b in a state in which the lid 412 is connected to the block surface 30b, the side wall portion 33a and the receiving surface 10a of the metal base place 10. The protrusion portion 34 has a side wall portion 34a orthogonal to the block surface 30c, and the physical quantity measurement sensor 40 which is held on the block surface 30c is joined to the block surface 30c in a state in which the lid 412 is connected to the block surface 30c, the side wall portion 34a, and the receiving surface 10a of the metal base plate 10. In this case, the receiving surface 10a of the metal base plate 10 fulfills a function similar to that of the side wall portions 31a, 32a, 33a and 34a.

The bonding between the metal block 30 and the physical quantity measurement sensor 40 in the physical quantity measurement device 100 is performed using the bonding member 50 such as an adhesive. The physical quantity measurement sensors 40 on the block surfaces 30a, 30b and 30c are positioned such that the centers thereof are included in the region of the block surface 30a interposed between the two grooves 36a, in the region of the block surface 30b interposed between the two grooves 36b, and in the region of the block surface 30c interposed between the two grooves 36c, respectively, and are bonded to the metal block 30 through the bonding member 50. In addition, an edge portion of the physical quantity measurement sensor 40 in the Y-axis direction is bonded to the block surface 30a, an edge portion of the physical quantity measurement sensor 40 in the X-axis direction is bonded to the block surface 30b, and an edge portion of the physical quantity measurement sensor 40 in the Z-axis direction is bonded to the block surface 30c, all through the bonding member 50, which leads that the physical quantity measurement sensors 40 are bonded to the metal block 30.

Here, since the physical quantity measurement sensors 40 are bonded to the regions interposed between the two grooves 36a, 36b and 36c in the block surfaces 30a, 30b and 30c, respectively, by applying the bonding member 50 to the block surfaces 30a, 30b and 30c, an extra amount of the bonding member 50 flows into the grooves 36a, 36b and 36c, whereby it is possible to prevent the bonding member 50 from spreading to the corner portions of the physical quantity measurement sensors 40. Therefore, it is possible to prevent the thermal stress from concentrating on the corner portions of the physical quantity measurement sensor 40 due to the difference in the thermal expansion coefficient between the bonding member 50 and the physical quantity measurement sensor 40, and it is also possible to reduce a decrease in airtightness of the physical quantity measurement sensor 40. In this way, the physical quantity measurement device 100 capable of maintaining high accuracy can be provided.

In the physical quantity measurement device 10 having the configuration described above, the block surfaces 30a, 30b and 30c, and the protrusion portions 31, 32, 33 and 34 correspond to the holding portions. The block surfaces 30a, 30b and 30c correspond to the bottom surface portion on which the physical quantity measurement sensor 40 is positioned, the side wall portions 31a, 32a, 33a and 34a, and the receiving surface 10a of the metal base plate 10 are arranged to intersect with corresponding bottom surface portions. The metal block and the metal base plate 10 are preferably good for transferring heat of each of the physical quantity measurement sensors 40, and aluminum (Al) which is lightweight and easy to process is used for the physical quantity measurement device 100.

Next, the physical quantity measurement sensor 40 which is included in the physical quantity measurement device 100 will be described with reference to FIGS. 3 and 4.

Figure 3:
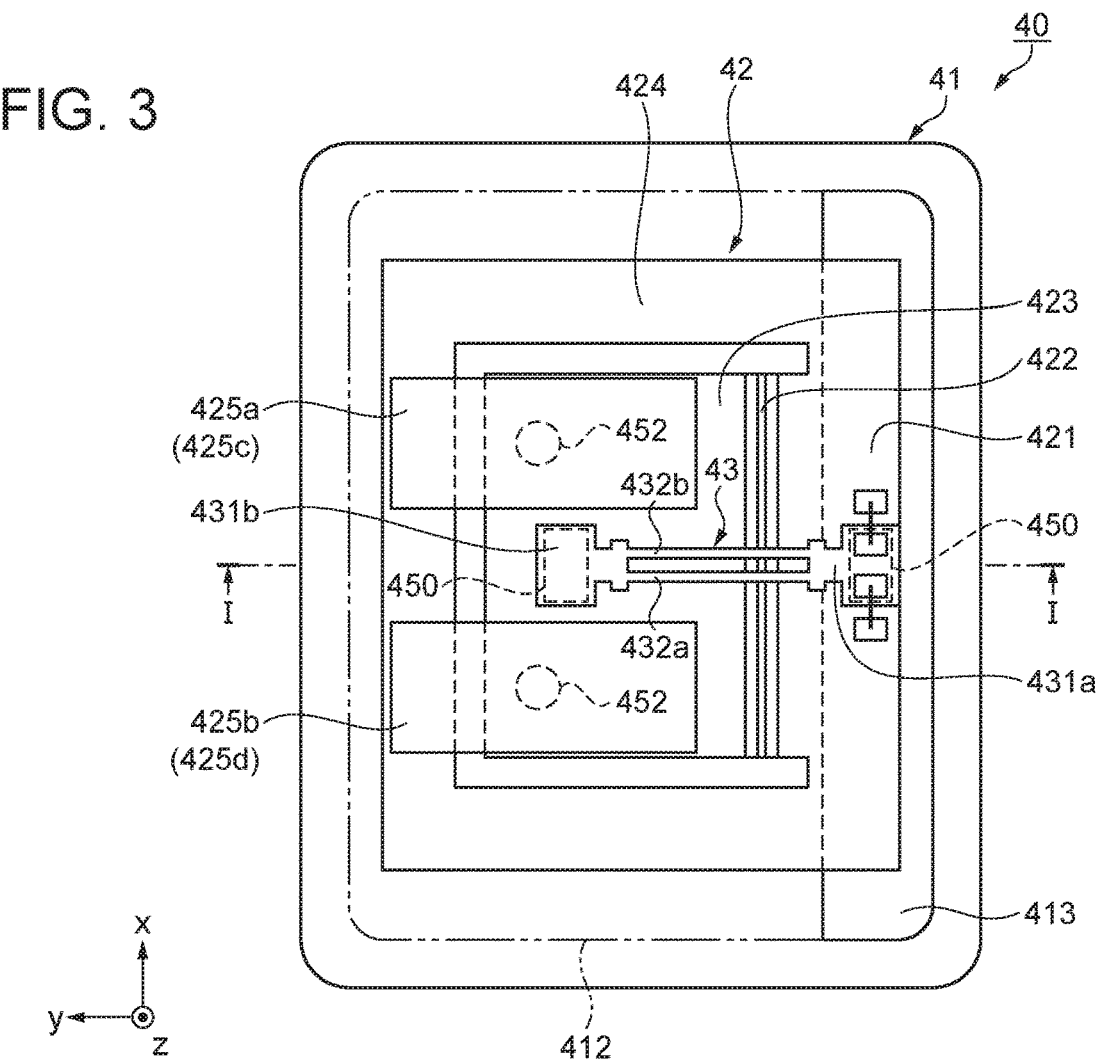
FIG. 3 is a plan view showing a configuration of a physical quantity measurement sensor.
Figure 4:
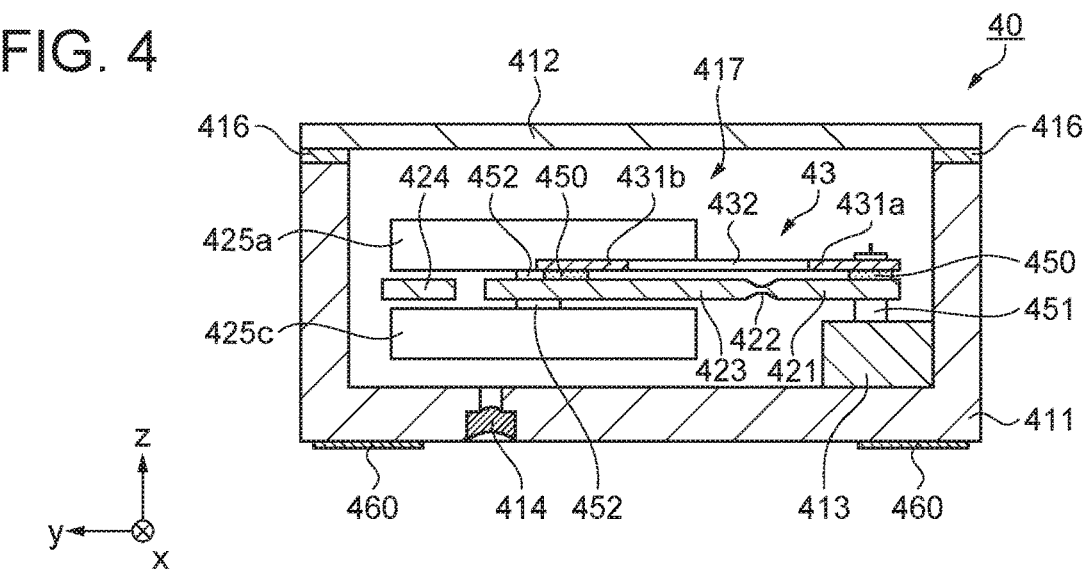
FIG. 4 is a cross sectional view showing the configuration of the physical quantity measurement sensor.

FIG. 3 is a plan view showing a configuration of the physical quantity measurement sensor, and FIG. 4 is a cross sectional view showing the configuration of the physical quantity measurement sensor. FIG. 4 shows a cross section taken along line I-I in FIG. 3. In FIGS. 3 and 4, the X-axis, the Y-axis and the Z-axis different from coordinate axes used in FIGS. 1 and 2 are shown as three axes orthogonal to one another.

The physical quantity measurement sensor 40 includes a package 41, an element base body 42 and sensor element 43. First, the package 41 includes an open-box shaped package base 411 and a plate-shaped lid (lid body) 412. The package base 411 has a receiving section 417 that is an empty space inside the open-box shaped package, a step portion 413 provided along the X-axis direction at the end of the bottom plate for fixing the element base body 42, and a sealing section 414 having a hole penetrating the bottom plate and a sealing material for closing the hole, and an external terminal 460 for connection with an oscillation circuit board (not shown) is formed on the surface of the bottom plate opposite to the step portion 413. The package base 411 is made of an aluminum oxide sintered body obtained by firing a ceramic green sheet. The aluminum oxide sintered body is excellent for the package, but is difficult to process. However, in this case, the aluminum oxide sintered body can be easily formed by stacking and firing a plurality of ceramic green sheets. The package base 411 can also be formed using a material such as quartz, glass, silicon, or the like.

Further, the lid 412 is disposed to cover the element base body 42 fixed to the step portion 413 of the package base 411. For the lid 412, the same material as that of the package base 411, or a metal such as kovar, stainless, or the like can be used. In this case, since it is preferable to form the lid 412 with a metal having good thermal conductivity, kovar is used. The lid 412 is joined to the package base 411 via a seaming ring 416, and when the package base 411 is joined to the lid 412, the receiving section 417 can be sealed in a pressure-reduced and airtight state.

In the physical quantity measurement sensor 40, the sealing of the receiving section 417 is performed by a method of evacuating the receiving section 417 of air via the hole of the sealing section 414 to reduce pressure after joining the package base 411 and the lid 412, and closing the hole with a blazing material (sealing material). In this way, the element base body 42 and the sensor element 43 are sealed in the receiving section 417 of which the inside is in a pressure-reduced and airtight state. In addition, the inside of the receiving section 417 may be filled with an inert gas such as nitrogen, helium, argon, or the like.

Next, the element base body 42 has a plate shape, which is formed from a quartz crystal plate by etching or the like, and includes a fixed portion 421 fixed to the step portion 413 of the package base 411 with an adhesive 451 and extending in the X-axis direction, a joint portion 422 extending from the fixed portion 421 in the Y-axis direction, a movable portion 423 formed in a rectangular shape and extending from the joint portion 422 to the opposite side of the fixed portion 421, a frame portion 424 extending from one end of the fixed portion 421 to the other end of the fixed portion 421 along the outer edge of the movable portion 423, and mass portions 425 (425a, 425b, 425c and 425d) provided in the movable portion 423. In the element base body 42, the sensor element 43 extends from the fixed portion 421 to the movable portion 423 and is fixed.

The movable portion 423 is surrounded by the frame portion 424 and the fixed portion 421, and is in a state of a cantilever support, where the movable portion 423 is connected to the fixed portion 421 through the joint portion 422. The joint portion 422 is provided between the fixed portion 421 and the movable portion 423, and makes the fixed portion 421 and the movable portion 423 connected to each other. The joint portion 422 is formed so that the thickness is thinner than that of the fixed portion 421 or the movable portion 423, and functions as an intermediate hinge when the movable portion 423 is displaced (rotate) with respect to the fixed portion 421. The mass portions 425 (425a, 425b, 425c and 425d) provided in the movable portion 423 have a rectangular shape in a plan view from the Z-axis direction. The mass portions 425a and 425b are disposed on the side of the lid 412 of the movable portion 423 and are fixed with bonding portions 452 to the positions bilaterally symmetrical with respect to the sensor element 43. On the other hand, the mass portions 425c and 425d are disposed on the side of the package base 411 of the movable portion 423, and fixed with the bonding portions 452 so as to overlap with the mass portions 425a and 425b, respectively.

Next, the sensor element 43 has a base portion 431a that is fixed with the adhesive 450 to the fixed portion 421, a base portion 431b that is fixed with the adhesive 450 to the movable portion 423, and vibrating beam portions 432 (432a and 432b) that are provided between the base portion 431a and the base portion 431b so as to measure a physical quantity. In this case, the vibrating beam portion 432 has a prism shape and when a driving signal (AC voltage) is applied to an excitation electrode (not shown) provided in each of the vibrating beam portions 432a and 432b, the vibrating beam portions 432 create flexural vibration so as to be close to or away from each other along the X-axis direction. The excitation electrode is electrically connected to an external terminal 460 by a wiring (not shown) for applying the driving signal.

In this case, the sensor element 43 is formed by patterning a crystal substrate that has been cut off at a predetermined angle from a rough crystal or the like using photolithography technology and etching technology. Furthermore, the sensor element 43 is preferably made of the same material as that of the element base body 42 in consideration of reducing the difference in linear expansion coefficient between the sensor element 43 and the element base body 42.

As shown in FIG. 2, in the physical quantity measurement device 100, the physical quantity measurement sensor 40 connected to the block surface 30a of the metal block 30 is disposed such that the sensor element 43 runs along in the X-axis, and measures acceleration and the like around the Y-axis. The physical quantity measurement sensor 40 connected to the block surface 30b of the metal block 30 is disposed such that the sensor element 43 runs along the Z-axis, and measures acceleration and the like around the X-axis. The physical quantity measurement sensor 40 connected to the block surface 30c of the metal block 30 is disposed such that the sensor element 43 runs along the Y-axis, and measures acceleration and the like around the Z-axis. With such a disposition, the physical quantity measurement device 100 functions as a multi-axial measurement sensor.

Next, an operation of the physical quantity measurement sensor 40 will be described with reference to FIGS. 5 and 6.

Figure 5:
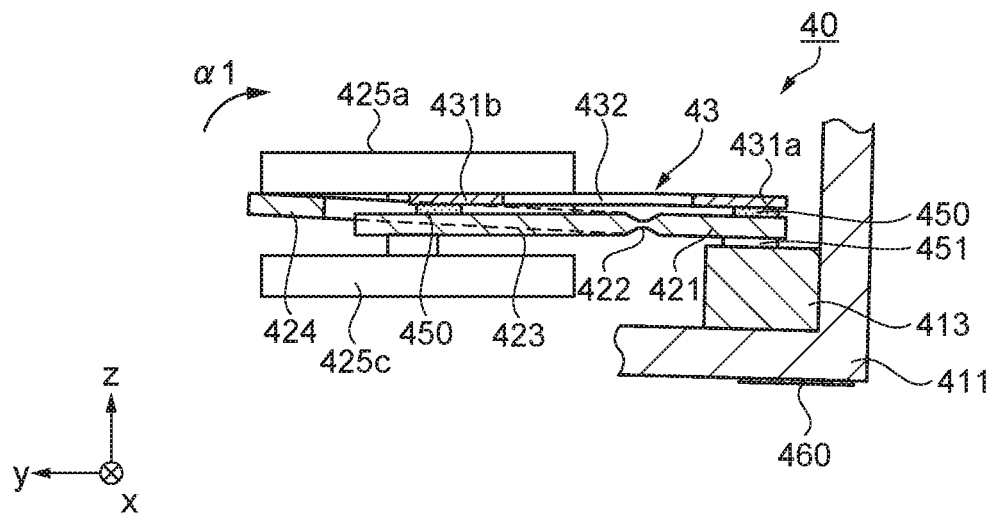
FIG. 5 is a cross sectional view showing an operation of the physical quantity measurement sensor.
Figure 6:
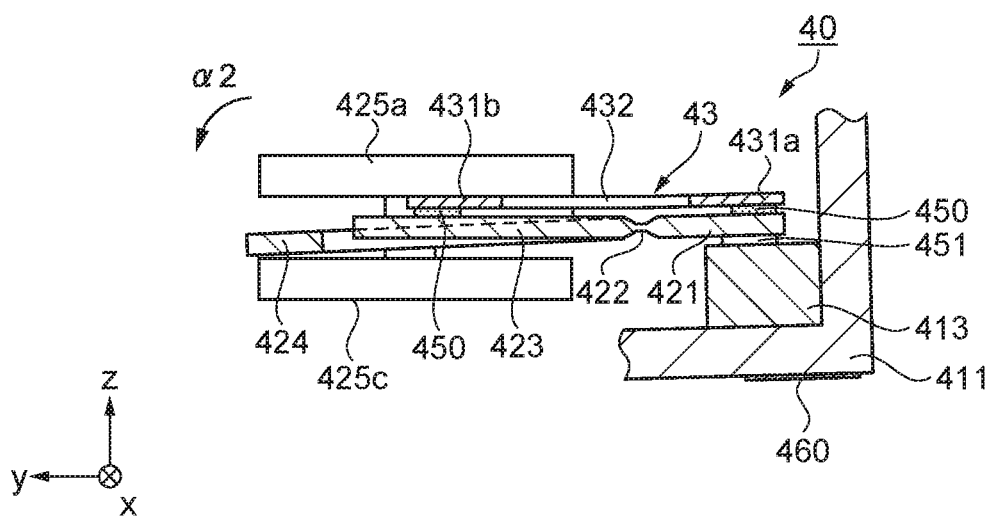
FIG. 6 is a cross sectional view showing an operation of the physical quantity measurement sensor.

FIGS. 5 and 6 are cross sectional views showing operations of the physical quantity measurement sensor.

As shown in FIG. 5, when acceleration is applied to the physical quantity measurement sensor 40, for example, in a direction of an arrow a1 in the +z direction, a force acts on the movable portion 423 in the +z direction, and the movable portion 423 is displaced in the +z direction with the joint portion 422 as a fulcrum. As a result, a force is applied to the physical quantity measurement sensor 40 in a direction to make the base portion 431a and the base portion 431b closer to each other in the Y-axis, and a compressive stress occurs in the vibrating beam portion 432 of the sensor element 43. Therefore, the resonance frequency which is the oscillation frequency of the vibrating beam portion 432 becomes low.

On the other hand, as shown in FIG. 6, when acceleration is applied to the physical quantity measurement sensor 40, for example, in a direction of an arrow α2 in the −z direction, a force acts on the movable portion 423 in the −z direction, and the movable portion 423 is displaced in the −z direction with the joint portion 422 as a fulcrum. As a result, a force is applied to the physical quantity measurement sensor 40 in a direction to make the base portion 431a and the base portion 431b further away from each other along the Y-axis, and a tensile stress occurs in the vibrating beam portion 432 of the sensor element 43. Therefore, the resonance frequency of the vibrating beam portion 432 becomes high.

The physical quantity measurement sensor 40 detects a change in the resonance frequency of the sensor element 43 as described above. That is, the acceleration applied to the physical quantity measurement sensor 40 is derived by conversion into a numerical value that is determined from a lookup table or the like in accordance with the rate of change in the resonance frequency that has been measured.

The physical quantity measurement sensor 40 can be also used as an inclinometer. In the physical quantity measurement sensor 40 as the inclinometer, the direction in which gravitational acceleration is applied to the physical quantity measurement sensor 40 varies in accordance with the change in attitude due to inclination, and tensile stress or compressive stress occurs in the vibrating beam portion 432. The resonance frequency of the vibrating beam portion 432 is changed, and the change in attitude due to inclination is derived.

The physical quantity measurement device 100 described above has the grooves 36a, 36b, and 36c formed in regions facing the physical quantity sensors 40 in the block surfaces 30a, 30b and 30c each including the three physical quantity measurement sensor 40. Therefore, in a case where the physical quantity measurement sensors 40 are held in the block surfaces 30a, 30b, and 30c with the bonding member 50 such as an adhesive, the extra amount of the bonding member 50 flows into the grooves 36a, 36b and 36c. As a result, it is possible to prevent the bonding member 50 from spreading over the entire physical quantity measurement sensor 40, and to reduce a decrease in airtightness of the physical quantity measurement sensor 40 due to stress distortion which is likely to occur at the corner portion of the physical quantity measurement sensor 40. Thereby, the physical quantity measurement device 100 can allow 3 physical quantity measurement sensors 40 to maintain high accuracy, and also to measure acceleration or the like accurately in three directions (multi-axis).

In addition, since the region of the physical quantity measurement sensor 40 including the center thereof is bonded to the metal block 30, the physical quantity measurement sensor 40 can be bonded with the bonding attitude of the sensor 40 being stable, and physical quantities can be measured with high accuracy. In other words, the center of the physical quantity measurement sensor 40 and the region of the metal block 30 to which the physical quantity measurement sensor 40 is bonded overlap with each other in a plan view from a direction in which the physical quantity measurement sensor 40 and the metal block 30 are stacked (overlapping direction).

Furthermore, since the physical quantity measurement sensor 40, including the edge portion thereof, is bonded to the metal block 30, it is possible to increase the bonding area such that the sensor 40 is not easily separated from the metal block 30, and to improve impact resistance. In other words, in a plan view from the direction in which physical quantity measurement sensor 40 and the metal block 30 are stacked, at least a part of the edge portion of the physical quantity measurement sensor 40 (a portion which becomes a contour of the physical quantity measurement sensor 40 in a plan view from the direction in which the physical quantity measurement sensor 40 and the metal block 30 are stacked) and the region where the metal block 30 and the physical quantity measurement sensor 40 are bonded to each other overlap with each other.

Since the grooves 36a, 36b, and 36c are provided in the direction intersecting with the direction extending from the fixed portion 421 of the movable portion 423, when the physical quantity measurement sensor 40 is bonded to the metal block 30, it is possible to prevent the bonding member 50 from spreading to the region of the fixed portion 421 of the sensor element 43. As a result, since the thermal stress due to the difference in the thermal expansion coefficient between the metal block 30 and the physical quantity measurement sensor 40 at the time of bonding cannot be easily transferred to the fixed portion 421, it is possible to keep measurement accuracy high.

Method of Manufacturing Physical Quantity Measurement Device

Next, a method of manufacturing the physical quantity measurement device 100 will be described with reference to FIG. 7.

Figure 7:
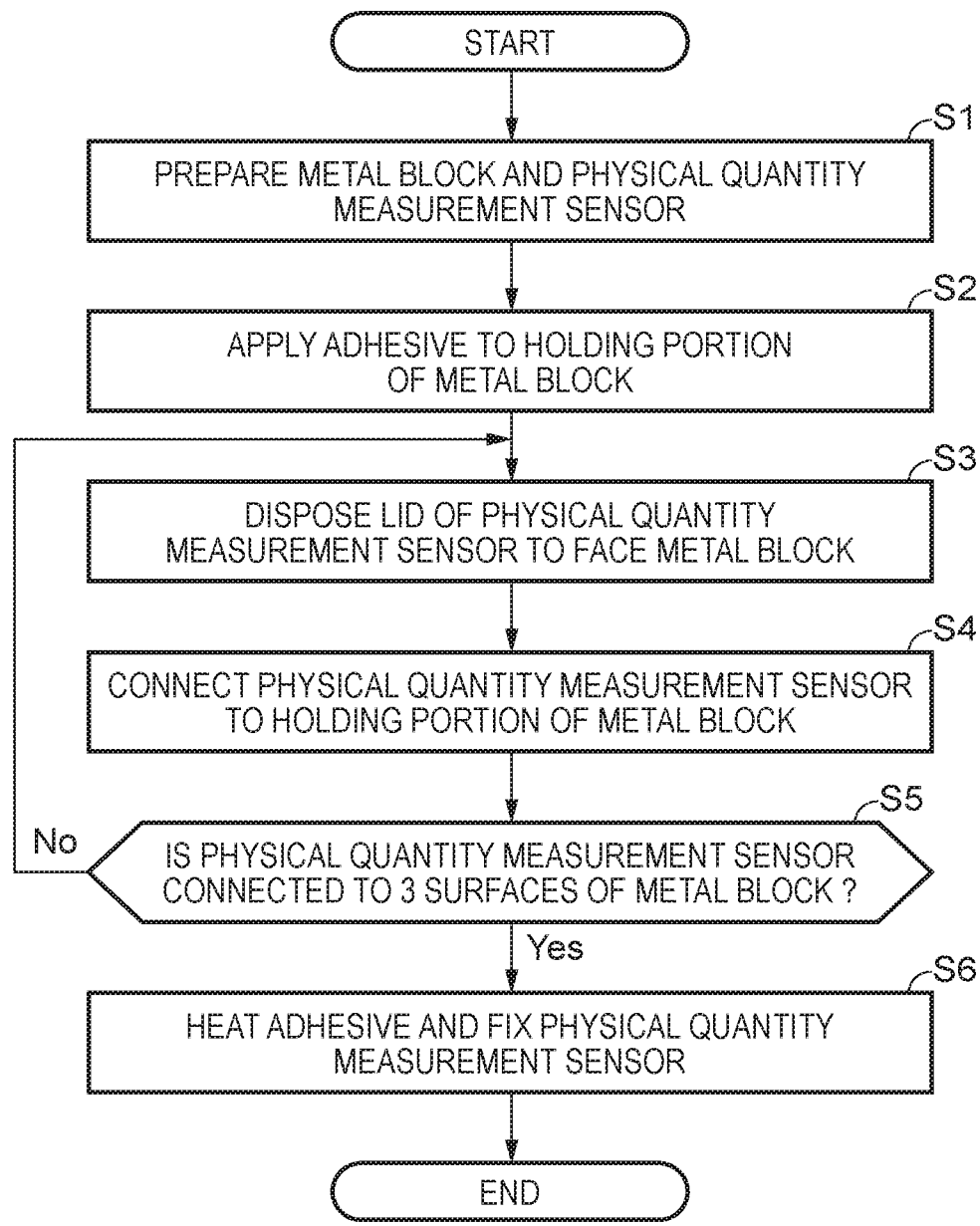
FIG. 7 is a flowchart showing a method of manufacturing the physical quantity measurement device.

FIG. 7 is a flowchart showing a method of manufacturing the physical quantity measurement device.

In step S1, the metal block 30 and physical quantity measurement sensors 40 are prepared. In a case of the physical quantity measurement device 100, the metal block 30 provided with grooves 36a, 36b, and 36c and three physical quantity measurement sensors 40 are prepared. Here, the metal base plate 10 is attached to the metal block 30, and the metal block 30 including the metal base plate 10 and the physical quantity measurement sensor 40 are separately manufactured in the previous step. In manufacturing the metal block 30 and the metal base plate 10, metal to be used is aluminum, but any metal having a thermal conductivity of 150 W/mk or more can be used for the metal block and the metal base plate. In addition to aluminum having a thermal conductivity of about 200 W/mk, examples include copper having a conductivity of about 370 W/mk, tungsten having a conductivity of about 190 W/mk, and silver having a conductivity of about 420 W/mk. Step S1 corresponds to the preparation step. After preparation, the method proceeds to step 2.

In step S2, the bonding member 50 such as an adhesive is applied to the block surfaces 30a, 30b and 30c that serve as the holding portions of the metal block 30. The bonding member 50 is applied to the region of the block surface 30a between the two grooves 36a, the region of the block surface 30b between the two grooves 36b, and the region of the block surface 30c between the two grooves 36c. The bonding member 50 is not particularly specified, but here an epoxy resin-based thermosetting adhesive is used. After application, the method proceeds to step S3.

In step S3, the lid (lid body) 412 of the physical quantity measurement sensor 40 is disposed to face the metal block 30. In the physical quantity measurement sensor 40, in this case, the lid 412 made of metal kovar has a relatively good thermal conductivity compared to the package base 411 of the ceramic aluminum oxide sintered body. For this reason, in the physical quantity measurement sensor 40, the side of the lid 412 is disposed to face the metal block 30 so that heat conduction between the physical quantity measurement sensor 40 and the metal block 30 is facilitated. Here, as described above with reference to FIG. 2, the physical quantity measurement sensor 40 allows the sensor element 43 to be arranged in a predetermined direction. Step S3 corresponds to the displacement step. After displacement, the method proceeds to step S4.

In step S4, the physical quantity measurement sensors 40 are connected to the block surfaces 30a, 30b and 30c of the metal block 30 and side wall portions 31a, 32a and 33a and 34a, respectively. That is, the physical quantity measurement sensors 40 where the sides of the lids 412 are disposed facing the metal block 30 are pressed against the block surfaces 30a, 30b and 30c and the side wall portions 31a, 32a, 33a and 34a where the bonding member 50 has been applied, respectively, and are connected to the metal block 30. The bonding member 50 has been already applied to the metal block 30 where the physical quantity measurement sensor 40 is to be positioned in step S2. Therefore, the physical quantity measurement sensor 40 is temporarily fixed to the block surfaces 30a, 30b and 30c by the bonding member 50. After the connection, the method proceeds to step S5.

In step S5, it is checked whether the physical quantity measurement sensors 40 are connected to the three surfaces of the metal block 30. The check is performed by a checking sensor or an operator. When the physical quantity measurement sensors 40 are connected to all the three surfaces of the metal block 30, the method proceeds to step S6. On the other hand, when the physical quantity measurement sensors 40 are connected to only one surface or two surfaces of the metal block, the method returns to step S3.

When all the connections of the physical quantity measurement sensors 40 are completely finished, the bonding member 50 is heated to bond the physical quantity measurement sensors 40 in step S6. Here, since the thermosetting bonding member 50 is used, the bonding member 50 is cured by heating, which results in the bonding of the physical quantity measurement sensors 40 to the metal block 30. Step S6 corresponds to the bonding step together with step S4. With this step, the flow related to the method of manufacturing the physical quantity measurement device 100 ends.

Second Embodiment

Next, another preferred example of the physical quantity measurement device 100 will be described.

Figure 8:
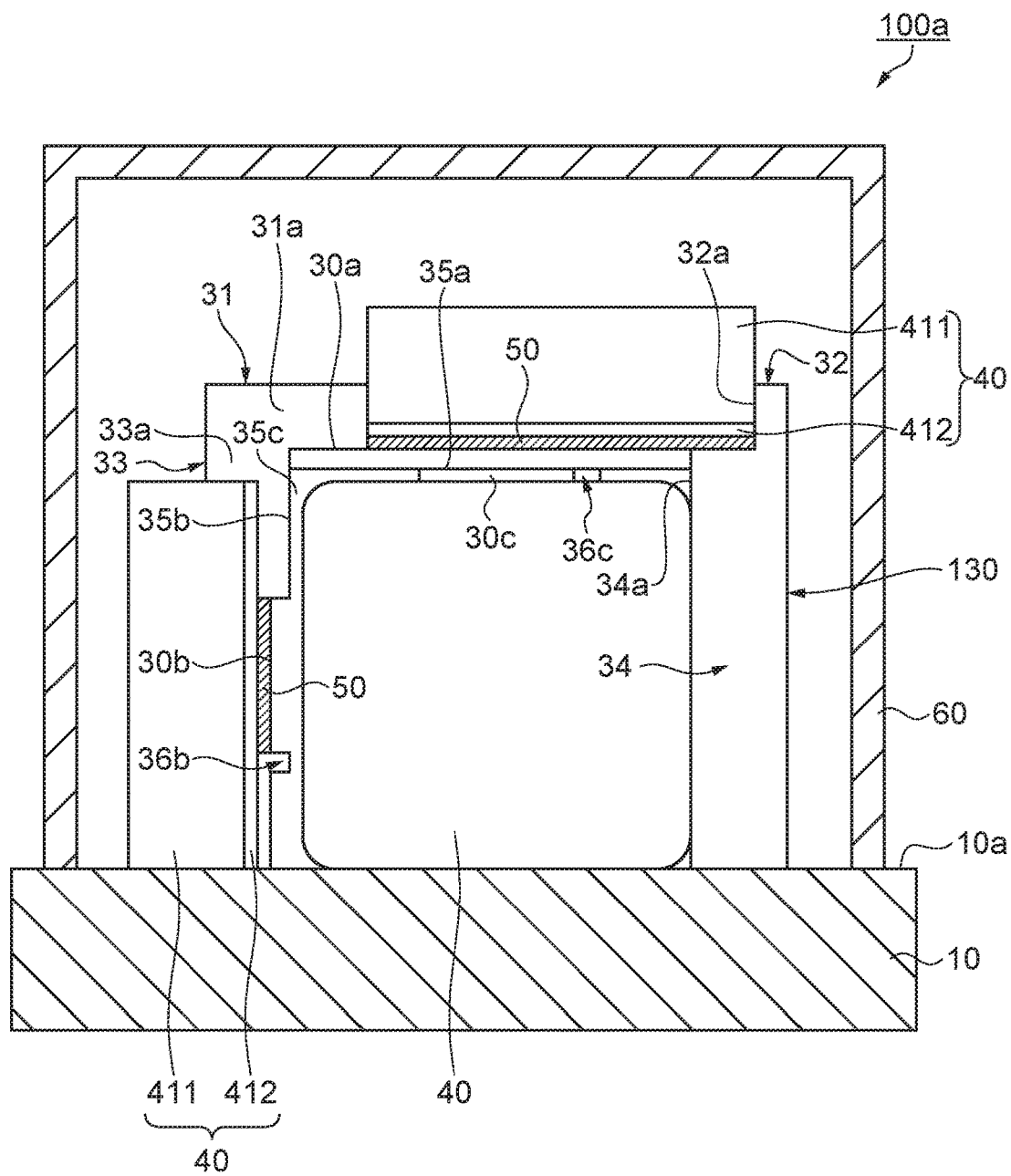
FIG. 8 is a cross sectional view showing a configuration of a physical quantity measurement device according to a second embodiment of the invention.
Figure 9:
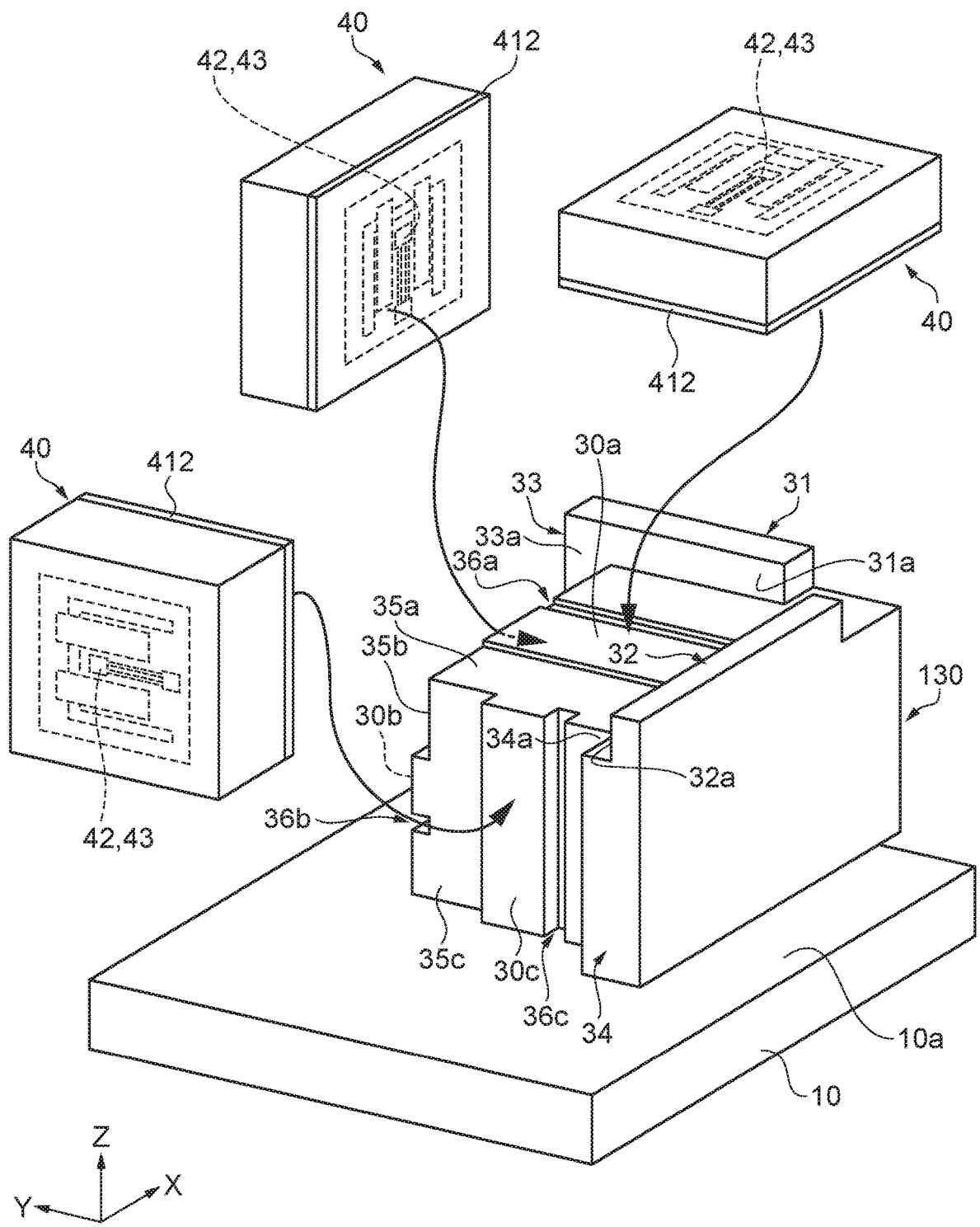
FIG. 9 is an exploded perspective view showing the configuration of the physical quantity measurement device according to the second embodiment.

FIG. 8 is a cross sectional view showing a configuration of a physical quantity measurement device according to a second embodiment of the invention. FIG. 9 is an exploded perspective view showing the configuration of the physical quantity measurement device according to the second embodiment.

The physical quantity measurement device 100*a* according to the second embodiment has a connecting feature of the metal block 130 and the physical quantity measurement sensor 40, and is different from the physical quantity measurement device 100 according to the first embodiment in the feature. Therefore, portions other than portions different from the first embodiment will be described by the same reference numerals as those in the first embodiment.

As shown in FIGS. 8 and 9, the physical quantity measurement device 100*a* includes a metal base plate 10, a metal block 130 that is positioned at a receiving surface 10*a* of the metal base plate 10, a physical quantity measurement sensor 40 that is positioned at each of three surfaces (a plurality of holding portions) including an upper surface on the opposite side of the metal base plate 10 of the metal block 130 and two side vertical surfaces adjacent to the upper surface, and a device cover 60.

On the upper surface (block surface 30*a*) where the physical quantity measurement sensor 40 is positioned, a groove 36*a* is formed on the side wall portion 31*a* along the Y-axis, and a step portion having a block surface 35*a* in contact with a block surface 30*c* is also formed. Similarly, on one side vertical surface (block surface 30*b*), a groove 36*b* is formed along the X-axis on the side of receiving surface 10*a* of the metal base plate 10, and a step portion having a block surface 35*b* in contact with a block surface 30*a* is also formed. On the other side vertical surface (block surface 30*c*), a groove 36*c* is formed along the Z-axis on the side of a side wall portion 34*a*, and a step portion having a block surface 35*c* in contact with a block surface 30*b* is also formed.

On the upper surface, the physical quantity measurement sensor 40 is bonded to the block surface 30*a* between the groove 36*a* and the step portion having the block surface 35*a* via the bonding member 50. On one side vertical surface (block surface 30*b*), the physical quantity measurement sensor 40 is bonded to the block surface 30*b* between the groove 36*b* and the step portion having the block surface 35*b* via the bonding member 50. On the other side vertical surface (block surface 30*c*), the physical quantity measurement sensor 40 is bonded to the block surface 30*c* between the groove 36*c* and the step portion having the block surface 35*c* via the bonding member 50.

In the physical quantity measurement device 100*a* having the configuration, since the grooves 36*a*, 36*b* and 36*c* and step portions are formed on the block surfaces 30*a*, 30*b* and 30*c* of the metal block 130 where the physical quantity measurement sensor 40 is held, the extra amount of the bonding member 50 flows into the grooves 36*a*, 36*b* and 36*c*, and the step portions. Therefore, it is possible to prevent the bonding member 50 from spreading over the entire physical quantity measurement sensor 40 and to reduce a decrease in airtightness of the physical quantity measurement sensor 40 due to stress distortion that is likely to occur at the corner portion of the physical quantity measurement sensor 40. In this way, in the physical quantity measurement device 100*a*, it is possible to keep accuracy of three physical quantity measurement sensors high and to measure acceleration or the like in three directions (multi-axis) accurately.

Third Embodiment

Figure 10:
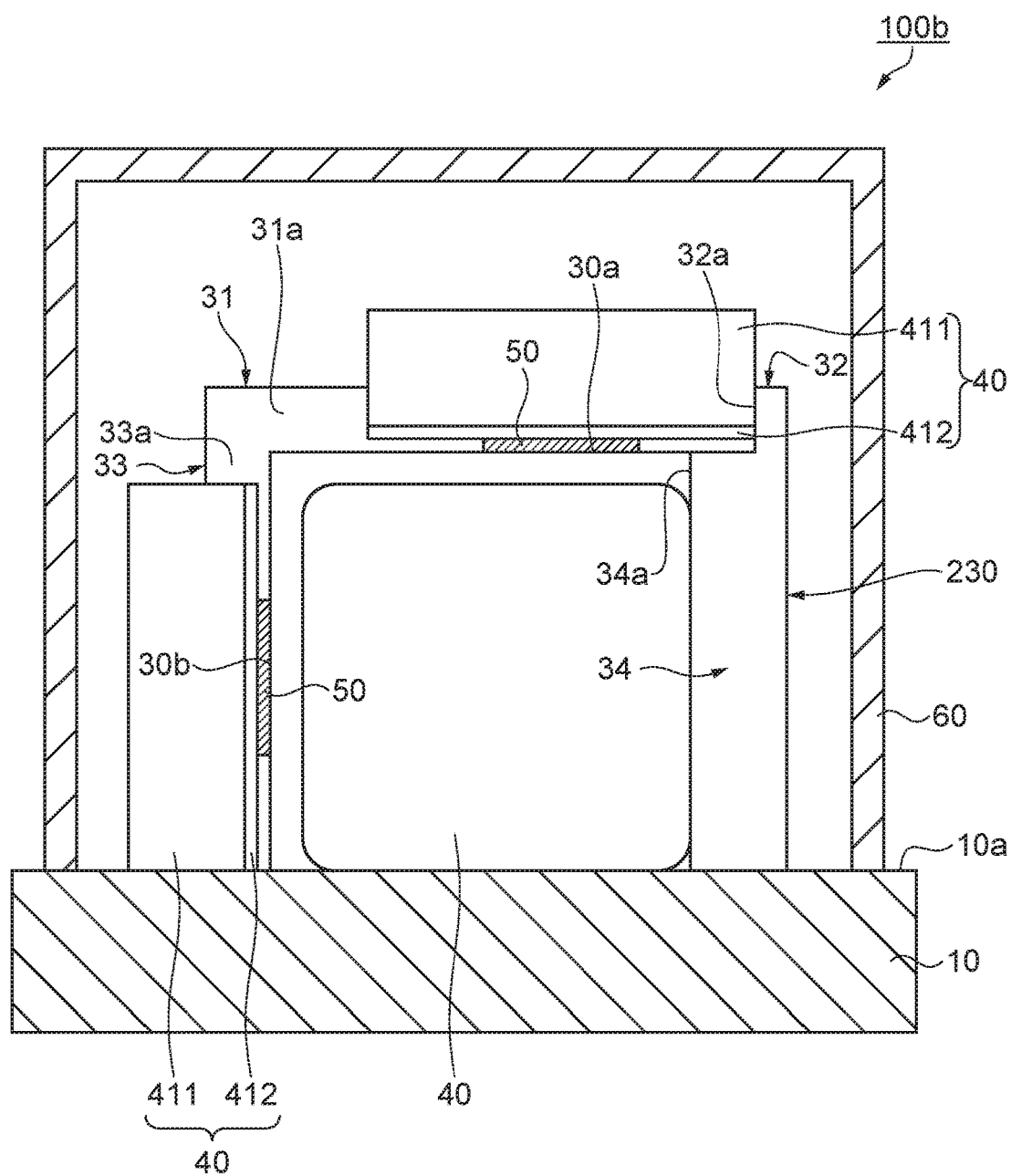
FIG. 10 is a cross sectional view showing a configuration of a physical quantity measurement device according to a third embodiment of the invention.
Figure 11:
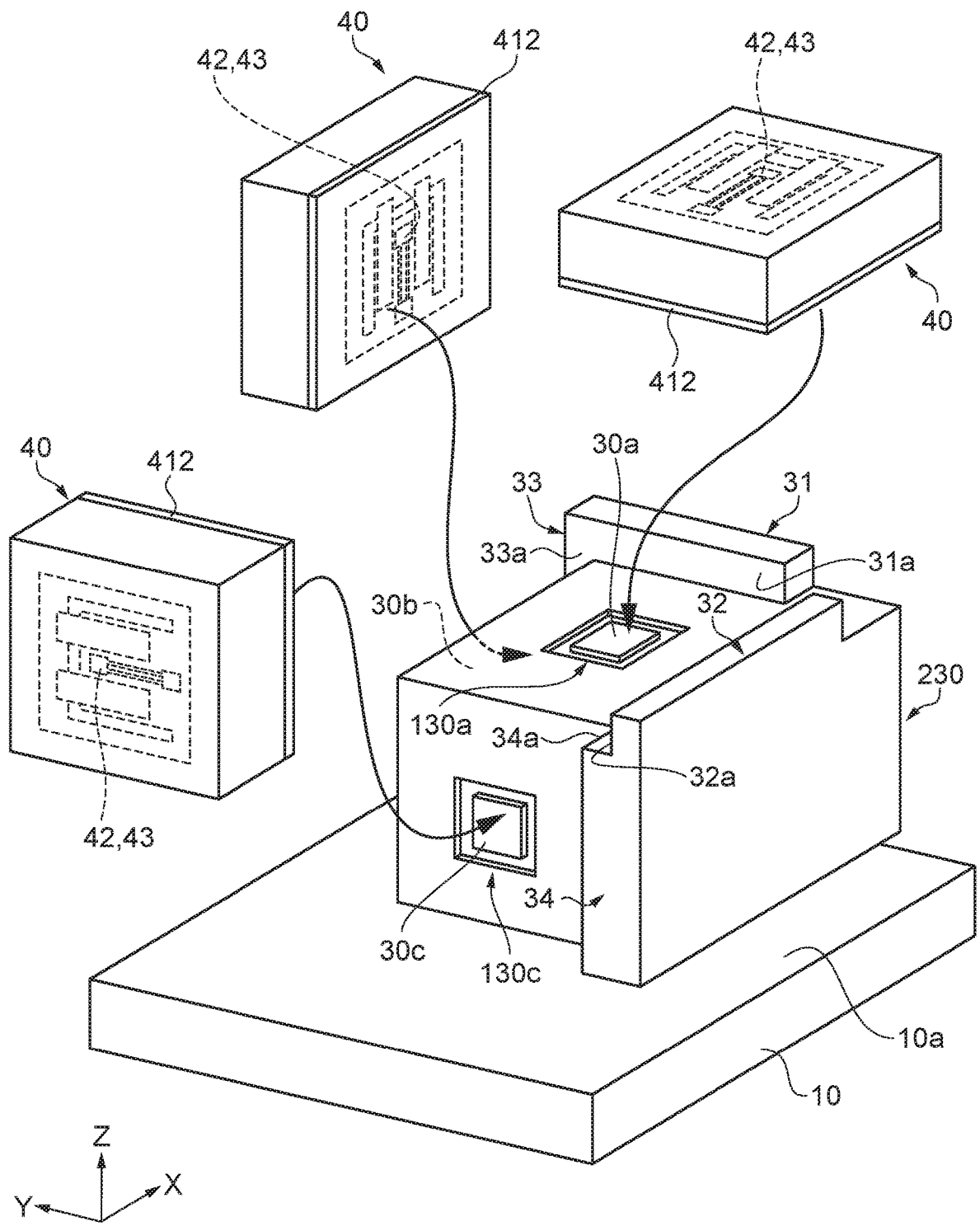
FIG. 11 is an exploded perspective view showing the configuration of the physical quantity measurement device according to the third embodiment.

Next, yet another preferred example of the physical quantity measurement device 100 will be described. FIG. 10 shows a cross section showing a configuration of a physical quantity measurement device according to a third embodiment of the invention. FIG. 11 is an exploded perspective view showing the configuration of the physical quantity measurement device according to the third embodiment.

The physical quantity measurement device 100*b* according to the third embodiment has a connecting feature of the metal block 230 and the physical quantity measurement sensor 40, and is different from the physical quantity measurement device 100 according to the first embodiment in the feature. Therefore, portions other than portions different from the first embodiment will be described by the same reference numerals as those in the first embodiment.

As shown in FIGS. 10 and 11, the physical quantity measurement device 100*b* includes a metal base plate 10, a metal block 230 that is positioned at a receiving surface 10*a* of the metal base plate 10, a physical quantity measurement sensor 40 that is positioned at each of three surfaces (a plurality of holding portions) including an upper surface on the opposite side of the metal base plate 10 of the metal block 230 and two side vertical surfaces adjacent to the upper surface, and a device cover 60.

On the upper surface (block surface 30*a*) where the physical quantity measurement sensor 40 is positioned, in a plan view from a direction in which the physical quantity measurement sensor 40 and the block surface 30*a* are stacked, a rectangular block surface 30*a* surrounded by the groove 130*a* is formed. Similarly, on one side vertical surface (block surface 30*b*), a rectangular block surface 30*b* surrounded by a groove (not shown) is formed. On the other side vertical surface (block surface 30*c*), a rectangular block surface 30*c* surrounded by the groove 130*c* is formed.

The physical quantity measurement sensor 40 is bonded to the region of the block surface 30*a* surrounded by the groove 130*a* on the upper surface (block surface 30*a*) via the bonding member 50. On one side vertical surface (block surface 30*b*), the physical quantity measurement sensor 40 is bonded to the region of the block surface 30*b* surrounded by the groove (not shown) via the bonding member 50. On the other side vertical surface (block surface 30*c*), the physical quantity measurement sensor 40 is bonded to the region of the block surface 30*c* surrounded by the groove 130*c* via the bonding member 50.

In the physical quantity measurement device 100*b* having the configuration, since the regions to which the physical quantity measurement sensors 40 are bonded are surrounded by the grooves 130*a* and 130*c*, it is possible to prevent the bonding member 50 from spreading to the corner portions of the physical quantity measurement sensors 40. Therefore, it is possible to reduce a decrease in airtightness of the physical quantity measurement sensor 40 due to stress distortion that is likely to occur at the corner portion of the physical quantity measurement sensor 40. In this way, in the physical quantity measurement device 100*b*, it is possible to keep accuracy of three physical quantity measurement sensors 40 high, and to measure acceleration or the like in three directions (multi-axis) accurately.

Electronic Apparatus

Next, an electronic apparatus using the physical quantity measurement device 100, 100a or 100b will be described with reference to FIGS. 12 and 13.

Figure 12:
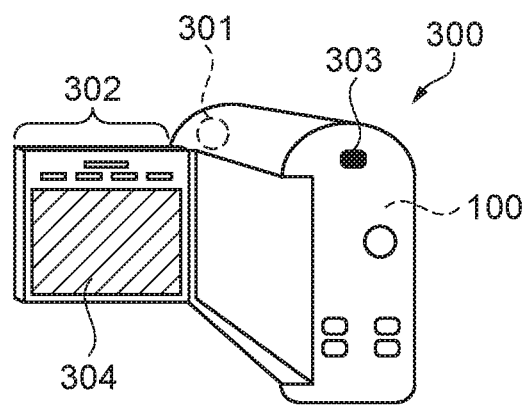
FIG. 12 is a perspective view showing a video camera on which a physical quantity measurement device is mounted.
Figure 13:
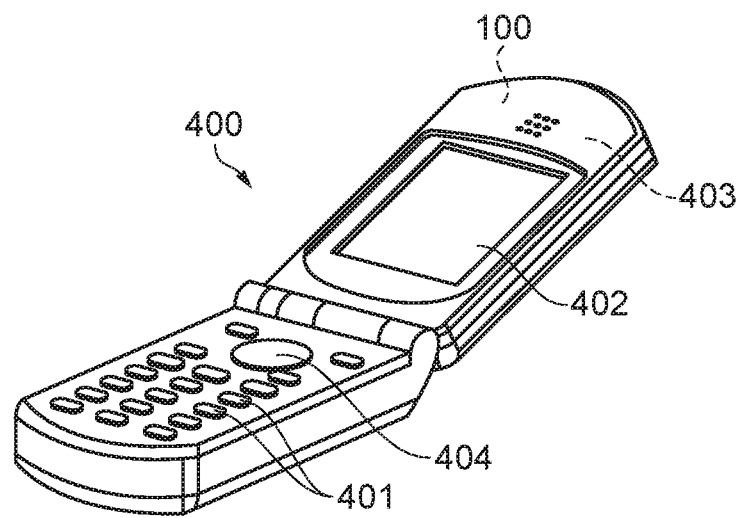
FIG. 13 is a perspective view showing a cellular phone on which a physical quantity measurement device is mounted.

FIG. 12 is a perspective view showing a video camera including the physical quantity measurement device, and FIG. 13 is a perspective view showing a cellular phone including a physical quantity measurement device.

A video camera 300 and a mobile phone 400 as an example of the electronic apparatus are equipped with the physical quantity measurement device 100, 100a or 100b according to the invention. First, the video camera 300 shown in FIG. 12 includes an image receiving section 301, an operation section 302, a voice input section 303 and a display 304. The video camera 300 includes the physical quantity measurement device 100, and the three physical quantity measurement sensors 40 measure acceleration or the like in directions of the X-axis, the Y-axis and the Z-axis (not shown) while maintaining a uniform temperature state, whereby the function of correcting camera shake can be exerted. As a result, the video camera 300 can record a clear moving picture video image.

The mobile phone 400 shown in FIG. 13 includes a plurality of operation buttons 401, a display 402, a camera mechanism 403, and a shutter button 404, and functions as the telephone set and the camera. The mobile phone 400 includes the physical quantity measurement device 100, and the three physical quantity measurement sensors 40 measure acceleration or the like in directions of the X-axis, the Y-axis and the Z-axis (not shown) while maintaining constant temperature, whereby the function of correcting camera shake of the camera mechanism 403 can be exerted. As a result, the mobile phone 400 can record a clear image by the camera mechanism 403.

The entire disclosure of Japanese Patent Application No. 2017-023837, filed Feb. 13, 2017 is expressly incorporated by reference herein.

What is claimed is:

1. A physical quantity measurement device comprising:
a base plate;
a holding member that is disposed on the base plate, the holding member having a rectangular parallelepiped shape;
a first surface of the holding member directly connected to the base plate;
second, third, and fourth surfaces of the holding member respectively extending in X-axis, Y-axis, and Z-axis directions, the second, third, and fourth surfaces having first, second, and third grooves, respectively, the first, second, and third grooves respectively extending in the X-axis, Y-axis, and Z-axis directions, each of the first, second, and third grooves extending across an entirety of each of the second, third, and fourth surfaces; and
first, second, and third physical quantity measurement sensors that are respectively fixed on the second, third, and fourth surfaces via an adhesive so as to span the first, second, and third grooves,
wherein the first, second, and third grooves are discrete from each other,
the adhesive is located between the holding member and each of the first, second, and third physical quantity measurement sensors and in the first, second, and third grooves,
wherein each of the first, second, and third physical quantity measurement sensors includes a movable member, a fixed member, and a joint member that is located between the movable member and the fixed member,
the joint members of the first, second, and third physical quantity measurement sensors extend along extending directions of the first, second, and third grooves, respectively,
each of the first, second and third grooves is configured by a pair of grooves extending parallel to each others, and the adhesive is only applied on a surface between the pair of grooves, and
a thermal expansion coefficient of the adhesive is different from a thermal expansion coefficient of each of the first, second, and third physical quantity measurement sensors.

2. The physical quantity measurement device according to claim 1,
wherein each of the first, second, and third grooves intersects with at least a part of an edge of each of the first, second, and third physical quantity measurement sensors in a plan view.

3. The physical quantity measurement device according to claim 1,
wherein a region of the holding member to which each of the first, second, and third physical quantity measurement sensors is bonded overlaps with a center of each of the first, second, and third physical quantity measurement sensors in a plan view.

4. The physical quantity measurement device according to claim 1,
wherein each of the first, second, and third physical quantity measurement sensors has a sensor element including the movable member extending from the fixed member via the joint member, and
extending directions of the movable members of the first, second, and third physical quantity measurement sensors intersect with the extending directions of the first, second, and third grooves, respectively.

5. An electronic apparatus comprising:
the physical quantity measurement device according to claim 1, each of the first, second, and third physical quantity measurement sensors being configured to detect a physical quantity of the electronic apparatus; and
a case that housed the physical quantity measurement device,
wherein a shake of the electronic apparatus is corrected in response to the detected physical quantities.

6. An electronic apparatus comprising:
the physical quantity measurement device according to claim 2, each of the first, second, and third physical quantity measurement sensors being configured to detect a physical quantity of the electronic apparatus; and
a case that housed the physical quantity measurement device,
wherein a shake of the electronic apparatus is corrected in response to the detected physical quantities.

7. An electronic apparatus comprising:
the physical quantity measurement device according to claim 3, each of the first, second, and third physical quantity measurement sensors being configured to detect a physical quantity of the electronic apparatus; and
a case that housed the physical quantity measurement device, wherein a shake of the electronic apparatus is corrected in response to the detected physical quantities.

8. An electronic apparatus comprising:
the physical quantity measurement device according to claim 4, each of the first, second, and third physical quantity measurement sensors being configured to detect a physical quantity of the electronic apparatus; and a case that housed the physical quantity measurement device, wherein a shake of the electronic apparatus is corrected in response to the detected physical quantities.

9. The physical quantity measurement device according to claim 1,
wherein each of the first, second, and third physical quantity measurement sensors has a vibrating beam therein, and the vibrating beam is configured to measure a physical quantity.

10. The physical quantity measurement device according to claim 9,
wherein the extending directions of the first, second, and third grooves intersect with extending directions of the corresponding vibrating beams of the first, second, and third physical quantity measurement sensors, respectively, in a plan view.

* * * * *